US011365645B2

United States Patent
Biernat et al.

(10) Patent No.: US 11,365,645 B2
(45) Date of Patent: Jun. 21, 2022

(54) TURBINE SHROUD COOLING

(71) Applicant: PRATT & WHITNEY CANADA CORP., Longueuil (CA)

(72) Inventors: Jacob Biernat, Lasalle (CA); Mohammed Ennacer, St-Hubert (CA); Remy Synnott, St-Jean-sur-Richelieu (CA); Andrey Potiforov, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/064,646

(22) Filed: Oct. 7, 2020

(65) Prior Publication Data

US 2022/0106887 A1    Apr. 7, 2022

(51) Int. Cl.
*F01D 11/08* (2006.01)
*F01D 25/24* (2006.01)
*F02C 7/12* (2006.01)

(52) U.S. Cl.
CPC .............. *F01D 11/08* (2013.01); *F01D 25/24* (2013.01); *F02C 7/12* (2013.01); *F05D 2240/11* (2013.01); *F05D 2240/127* (2013.01); *F05D 2260/201* (2013.01); *F05D 2260/2212* (2013.01)

(58) Field of Classification Search
CPC . F01D 11/08; F01D 25/24; F02C 7/12; F05D 2240/11; F05D 2240/127; F05D 2260/201; F05D 2260/2212
See application file for complete search history.

(56) References Cited

U.S. PATENT DOCUMENTS

| | | | |
|---|---|---|---|
| 3,831,258 A | 8/1974 | Elbert et al. | |
| 4,137,619 A | 2/1979 | Beltran et al. | |
| 4,383,854 A | 5/1983 | Dembowski et al. | |
| 4,604,780 A | 8/1986 | Metcalfe | |
| 4,871,621 A | 10/1989 | Bagley et al. | |
| 5,010,050 A | 4/1991 | Wullenweber et al. | |
| 5,130,084 A | 7/1992 | Matheny et al. | |
| 5,375,973 A * | 12/1994 | Sloop | F01D 25/12 415/173.1 |

(Continued)

OTHER PUBLICATIONS

European Search Report issued in counterpart application 21201536.6 dated Feb. 22, 2022.

*Primary Examiner* — Igor Kershteyn
(74) *Attorney, Agent, or Firm* — Norton Rose Fulbright Canada LLP

(57) ABSTRACT

A turbine shroud segment for a gas turbine engine having an annular gas path extending about an engine axis. The engine has a turbine rotor mounted for rotation about the axis and having a plurality of blades extending into the gas path. The turbine shroud segment includes a body extending axially between a leading edge and a trailing edge and circumferentially between a first and second lateral edges. The body has a radially outer surface and a radially inner surface. The radially outer surface includes a textured surface exposed to a cooling flow. The radially inner surface defines an outer flow boundary surface of the gas path next to a tip of one of the blades. A cooling flow passageway is defined in the body and extends axially between one or more cooling inlets receiving the cooling flow from the textured surface and one or more cooling outlets.

19 Claims, 8 Drawing Sheets

(56) References Cited

U.S. PATENT DOCUMENTS

| | | | |
|---|---|---|---|
| 5,486,090 A * | 1/1996 | Thompson | F01D 25/12 415/173.1 |
| 5,538,393 A | 7/1996 | Thompson et al. | |
| 5,553,999 A | 9/1996 | Proctor et al. | |
| 5,574,957 A | 11/1996 | Barnard et al. | |
| 5,772,748 A | 6/1998 | Hubbard | |
| 5,933,699 A | 8/1999 | Ritter et al. | |
| 5,950,063 A | 9/1999 | Hens et al. | |
| 6,102,656 A | 8/2000 | Nissley et al. | |
| 6,217,282 B1 | 4/2001 | Stanka | |
| 6,350,404 B1 | 2/2002 | Li et al. | |
| 6,547,210 B1 | 4/2003 | Marx et al. | |
| 6,595,750 B2 | 7/2003 | Parneix | |
| 6,679,680 B2 | 1/2004 | Um et al. | |
| 6,709,771 B2 | 3/2004 | Allister | |
| 6,776,955 B1 | 8/2004 | Lim et al. | |
| 6,779,597 B2 * | 8/2004 | DeMarche | F01D 11/24 165/169 |
| 6,857,848 B2 | 2/2005 | Fokine et al. | |
| 6,874,562 B2 | 4/2005 | Knott et al. | |
| 6,910,854 B2 | 6/2005 | Joslin | |
| 6,939,505 B2 | 9/2005 | Musso et al. | |
| 6,974,308 B2 | 12/2005 | Halfmann | |
| 7,029,228 B2 | 4/2006 | Chan et al. | |
| 7,033,138 B2 * | 4/2006 | Tomita | F01D 11/005 415/139 |
| 7,052,241 B2 | 5/2006 | Decker | |
| 7,114,920 B2 | 10/2006 | Synnott | |
| 7,128,522 B2 | 10/2006 | Jutras | |
| 7,175,387 B2 | 2/2007 | Kreis et al. | |
| 7,217,081 B2 | 5/2007 | Scheurlen et al. | |
| 7,234,920 B2 | 6/2007 | Imbourg et al. | |
| 7,306,424 B2 * | 12/2007 | Romanov | F01D 25/12 415/115 |
| 7,407,622 B2 | 8/2008 | Voice et al. | |
| 7,513,040 B2 | 4/2009 | Cunha et al. | |
| 7,517,189 B2 | 4/2009 | Camus | |
| 7,621,719 B2 | 11/2009 | Lutjen et al. | |
| 7,625,178 B2 | 12/2009 | Morris | |
| 7,665,962 B1 * | 2/2010 | Liang | F01D 11/24 415/173.1 |
| 7,687,021 B2 | 3/2010 | Imbourg et al. | |
| 7,857,581 B2 | 12/2010 | Mons et al. | |
| 7,875,340 B2 | 1/2011 | Cho et al. | |
| 8,313,301 B2 | 11/2012 | Hudson | |
| 8,366,383 B2 | 2/2013 | Thibodeau et al. | |
| 8,449,246 B1 | 5/2013 | Liang | |
| 8,459,934 B2 | 6/2013 | Hofmann | |
| 8,727,704 B2 * | 5/2014 | Lee | F01D 11/08 415/116 |
| 8,814,507 B1 | 8/2014 | Campbell | |
| 8,985,940 B2 | 3/2015 | Zhang | |
| 9,028,744 B2 | 5/2015 | Durocher et al. | |
| 9,611,754 B2 | 4/2017 | Taylor | |
| 9,677,412 B2 | 6/2017 | Jones | |
| 9,689,273 B2 | 6/2017 | Jones | |
| 9,784,125 B2 | 10/2017 | Duguay | |
| 9,822,654 B2 * | 11/2017 | Brandl | F01D 11/08 |
| 9,920,647 B2 | 3/2018 | Jones | |
| 9,926,799 B2 | 3/2018 | Romanov | |
| 10,107,128 B2 | 10/2018 | Romanov | |
| 10,174,622 B2 | 1/2019 | Zhang | |
| 10,196,917 B2 | 2/2019 | Lutjen et al. | |
| 2004/0047725 A1 | 11/2004 | Tomita | |
| 2005/0214156 A1 | 9/2005 | Troitski et al. | |
| 2009/0035125 A1 * | 2/2009 | Fujimoto | F01D 25/246 415/116 |
| 2009/0129961 A1 | 5/2009 | Lavoie | |
| 2010/0025001 A1 | 2/2010 | Lee et al. | |
| 2011/0033331 A1 | 2/2011 | Tuppen et al. | |
| 2011/0044805 A1 * | 2/2011 | Koyabu | F01D 11/24 415/177 |
| 2011/0250560 A1 | 10/2011 | Kwon et al. | |
| 2012/0186768 A1 | 7/2012 | Sun et al. | |
| 2013/0028704 A1 | 1/2013 | Thibodeau | |
| 2013/0071227 A1 * | 3/2013 | Thibodeau | F01D 9/04 415/1 |
| 2015/0093281 A1 | 4/2015 | Campomanes et al. | |
| 2016/0169016 A1 | 6/2016 | Blaney et al. | |
| 2016/0305262 A1 | 10/2016 | Durocher | |
| 2017/0101932 A1 | 4/2017 | Stover | |
| 2017/0211415 A1 | 7/2017 | Swift et al. | |

* cited by examiner

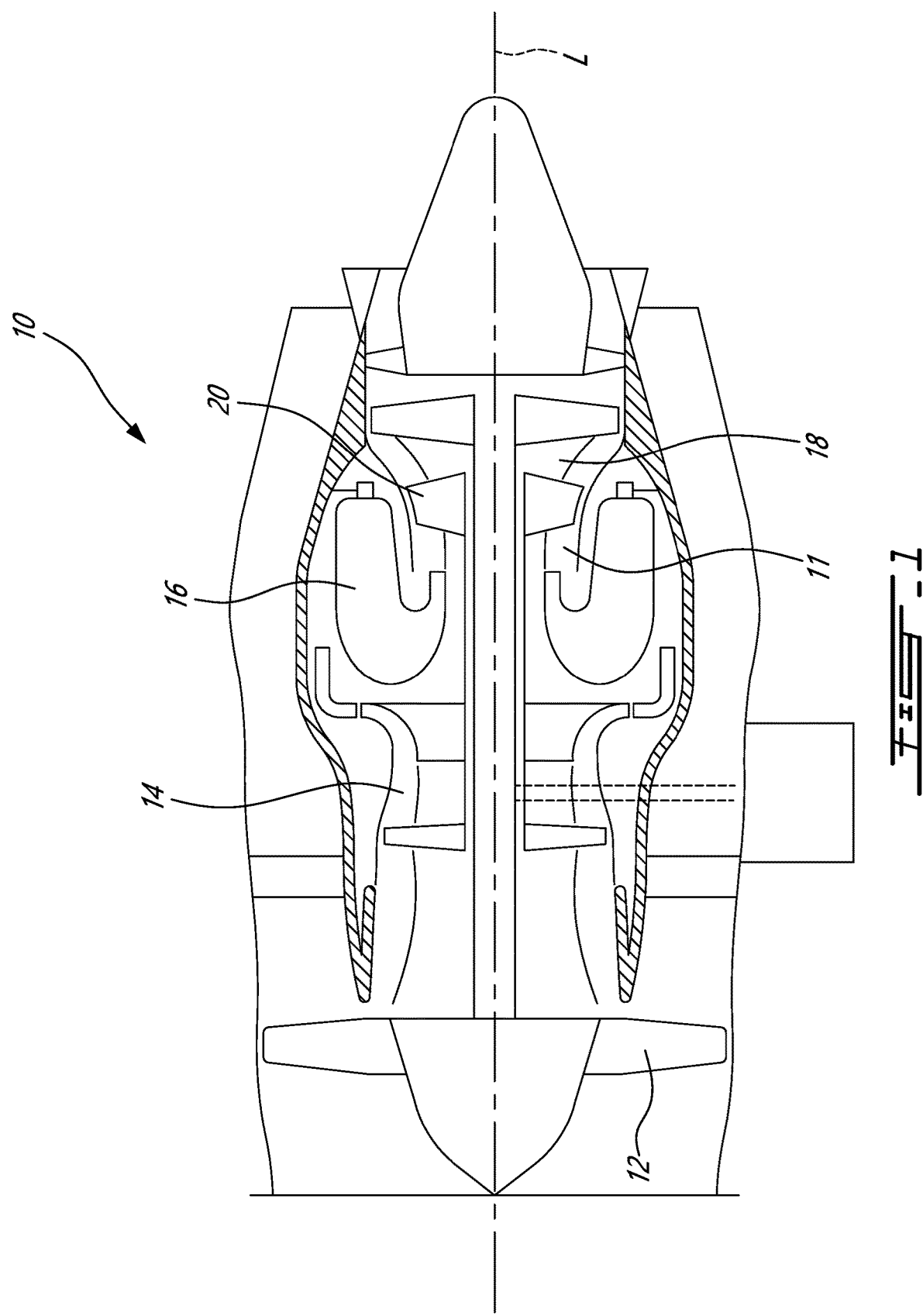

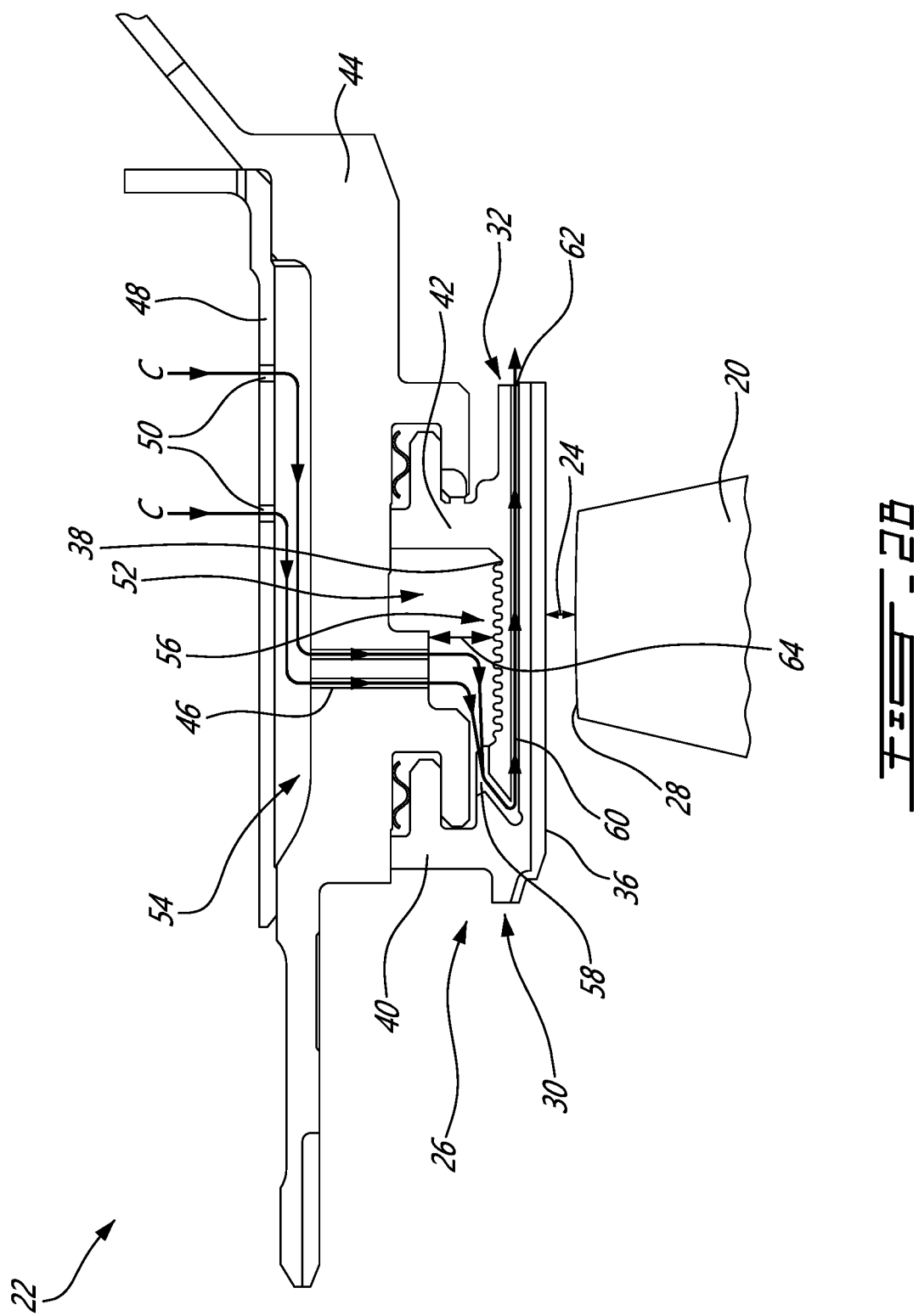

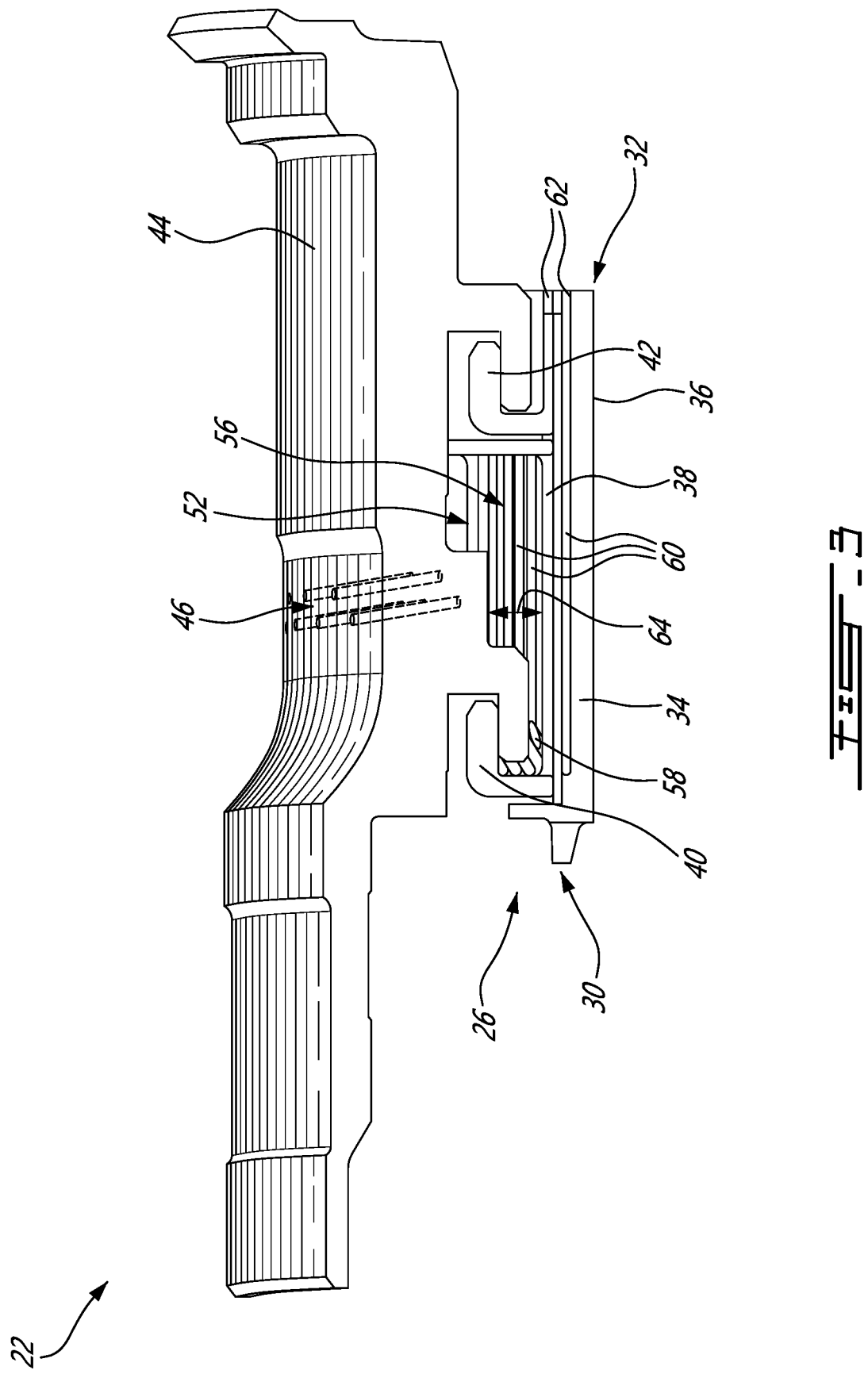

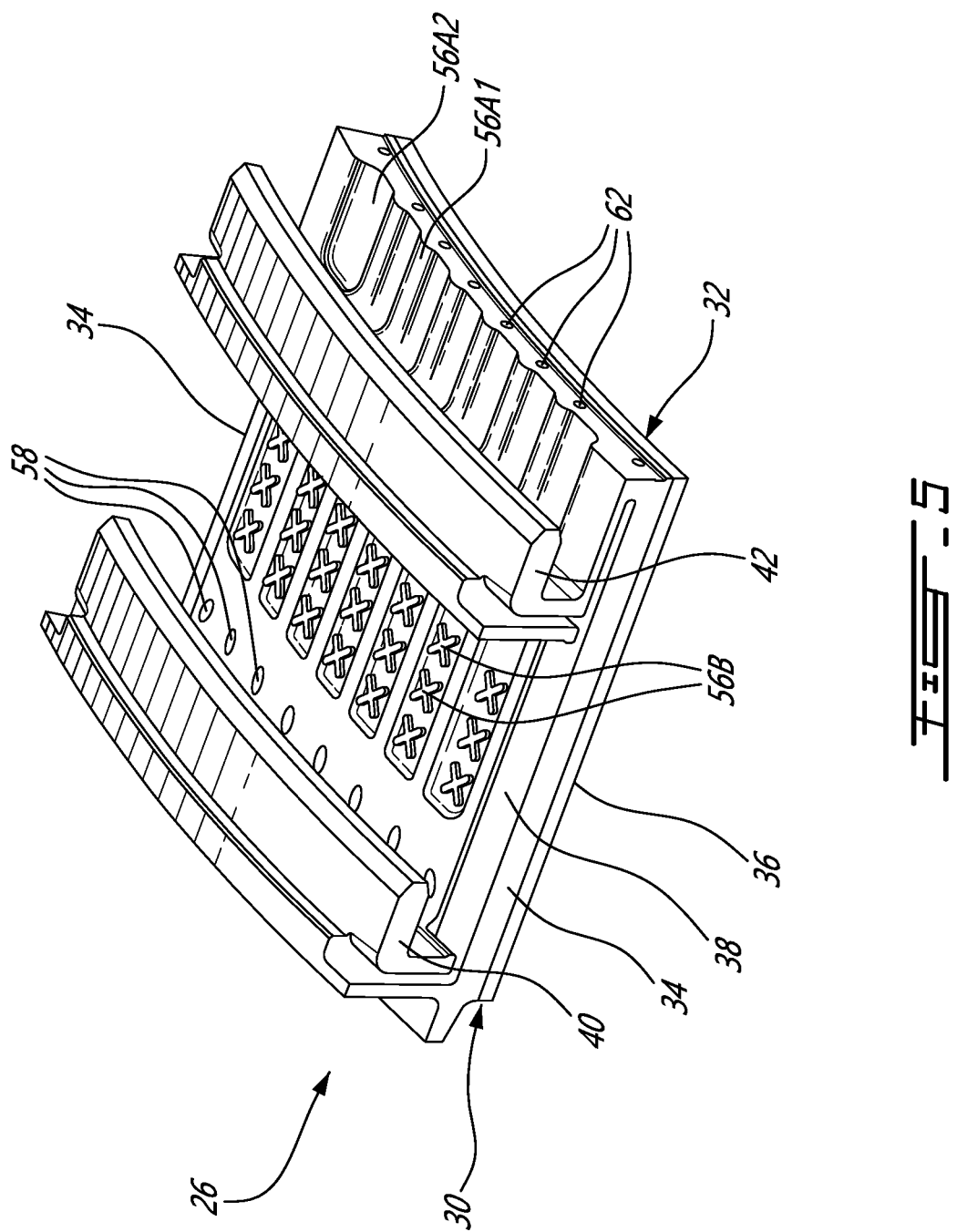

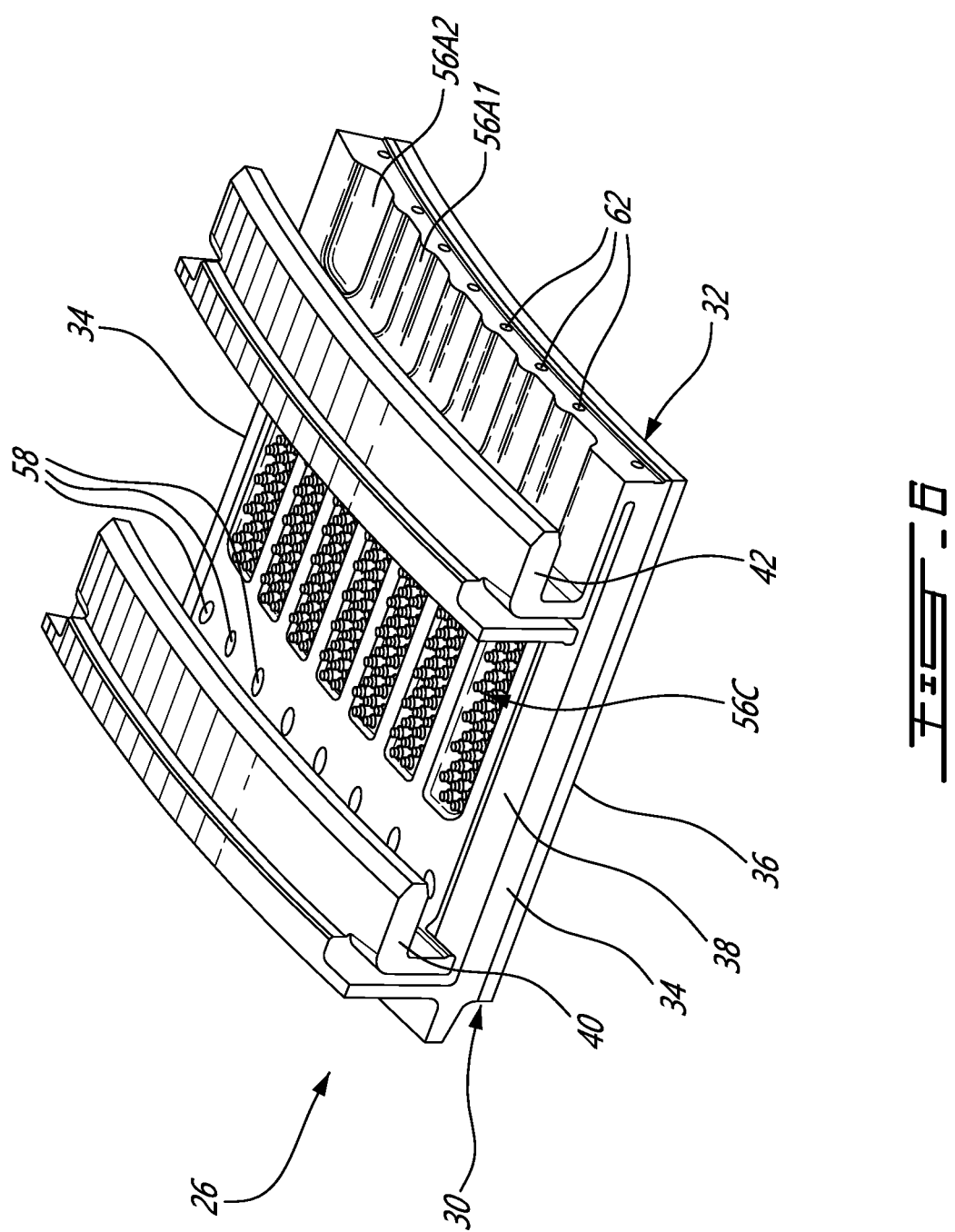

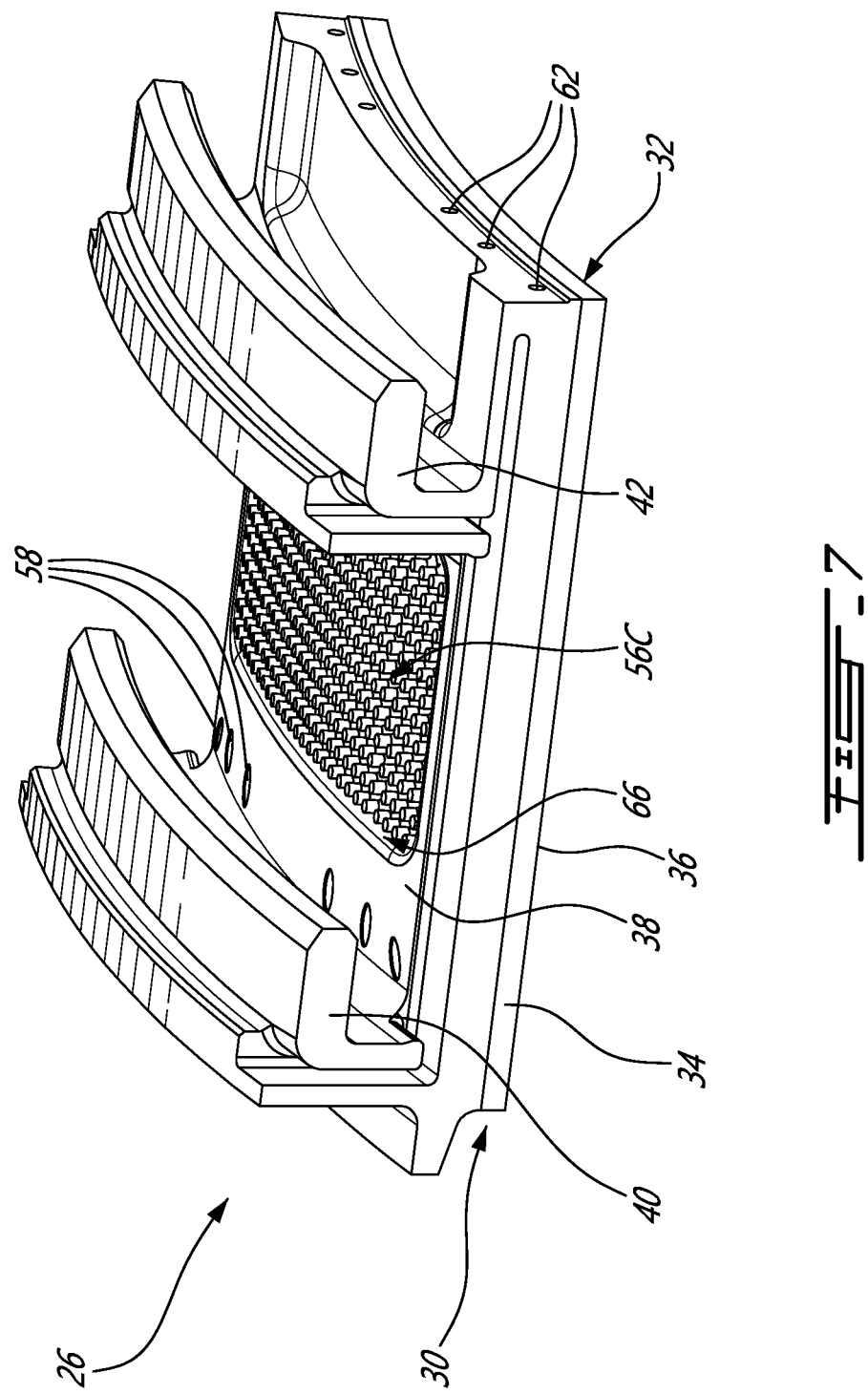

TURBINE SHROUD COOLING

TECHNICAL FIELD

The present disclosure relates generally to turbine shrouds and, more particularly, to turbine shroud cooling.

BACKGROUND

Turbine shroud segments are exposed to hot gases and, thus, require cooling.

Cooling air may be bled off from the compressor section, thereby reducing the amount of energy that can be used for the primary purpose of proving thrust. It is thus desirable to minimize the amount of air bleed from other systems to perform cooling. Various methods of cooling the turbine shroud segments may include directing the cooling flow through a core cavity within the shroud segment.

Although such methods have proven adequate in most situations, advancements in gas turbine engines have resulted in increased temperatures and more extreme operating conditions for those parts exposed to the hot gas flow.

SUMMARY

In one aspect, there is provided a turbine shroud segment for a gas turbine engine having an annular gas path extending about an engine axis, the gas turbine engine having a turbine rotor mounted for rotation about the engine axis and having a plurality of blades extending into the annular gas path, the turbine shroud segment comprising a body extending axially between a leading edge and a trailing edge and circumferentially between a first lateral edge and a second lateral edge, the body having a radially outer surface and a radially inner surface, the radially outer surface including a textured surface exposed to a cooling flow, the radially inner surface defining an outer flow boundary surface of the annular gas path next to a tip of one of the plurality of blades, and a cooling flow passageway defined in the body and extending axially between one or more cooling inlets receiving the cooling flow from the textured surface and one or more cooling outlets.

In a further aspect, there is provided a turbine shroud assembly for a gas turbine engine having an annular gas path extending about an engine axis, the turbine shroud assembly comprising a shroud segment including a body extending axially between a leading edge and a trailing edge and circumferentially between a first lateral edge and a second lateral edge, the body having a radially outer surface and a radially inner surface, the radially outer surface including a textured surface exposed to a cooling flow, one or more support legs extending radially outward from the radially outer surface, a cooling flow passageway defined in the body and extending axially from one or more cooling inlets at a front end adjacent the leading edge to one or more cooling outlets at a rear end adjacent the trailing edge, and a casing disposed radially outward from the shroud segment and engaged by the one or more support legs, the casing including one or more impingement holes directing the cooling flow into a cooling plenum defined between the casing and the radially outer surface and impinging the cooling flow onto the textured surface.

In a further aspect, there is provided a method for manufacturing a turbine shroud segment comprising creating a shroud body cast through a metal injection mold process, the body extending axially between a leading edge and a trailing edge and circumferentially between a first lateral edge and a second lateral edge, the body having a radially outer surface and a radially inner surface, the radially outer surface including a textured surface exposed to a cooling flow, a cooling flow passageway defined in the body and extending axially from a front end adjacent the leading edge to a rear end adjacent the trailing edge, one or more cooling inlets disposed on the radially outer surface along the front end of and in fluid communication with the cooling flow passageway, and one or more cooling outlets along the rear end of and in fluid communication with the cooling flow passageway.

BRIEF DESCRIPTION OF THE DRAWINGS

Reference is now made to the accompanying figures in which:

FIG. 1 is a schematic cross sectional view of a gas turbine engine;

FIG. 2B is a schematic cross-section of the turbine shroud assembly of FIG. 2A mounted radially outwardly in close proximity to the tip of a row of turbine blades of a turbine rotor;

FIG. 3 is a raised side view of the turbine shroud segment assembly of FIG. 2A;

FIG. 5 is a perspective view of a turbine shroud segment according to another embodiment of the present disclosure;

FIG. 6 is a perspective view of a turbine shroud segment according to another embodiment of the present disclosure; and FIG. 7 is a perspective view of a turbine shroud segment according to another embodiment of the present disclosure.

DETAILED DESCRIPTION

Figure 2A:
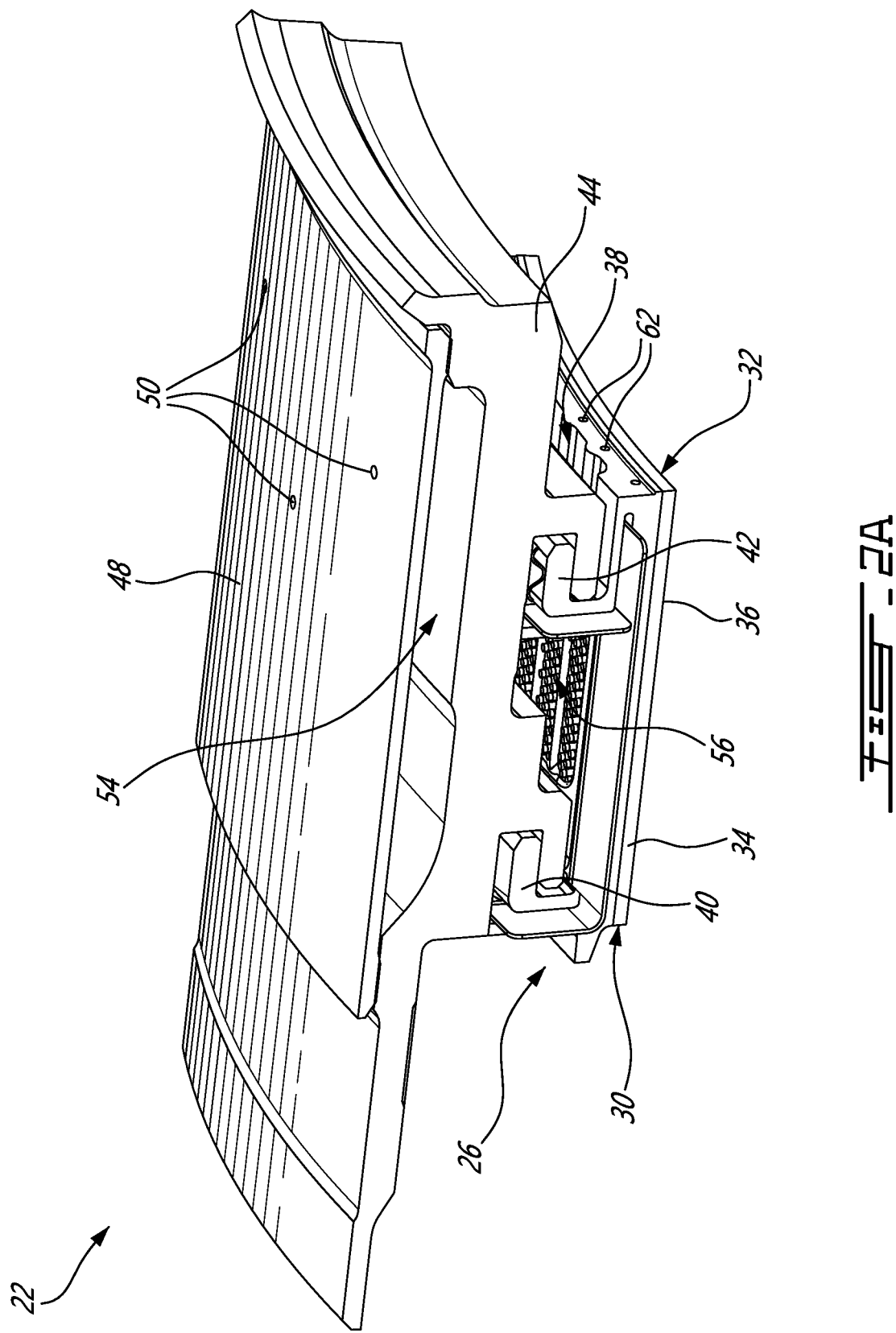
FIG. 2A is a perspective view of a turbine shroud assembly in accordance with an embodiment of the present disclosure.

FIG. 1 illustrates a gas turbine engine 10 of a type preferably provided for use in subsonic flight, generally comprising an annular gas path 11 disposed about an engine axis L. A fan 12, a compressor 14, a combustor 16 and a turbine 18 are axially spaced in serial flow communication along the gas path 11. More particularly, the engine 10 comprises a fan 12 through which ambient air is propelled, a compressor section 14 for pressurizing the air, a combustor 16 in which the compressed air is mixed with fuel and ignited for generating an annular stream of hot combustion gases, and a turbine 18 for extracting energy from the combustion gases.

As shown in FIGS. 1 and 2b, the turbine 18 includes turbine blades 20 mounted for rotation about the axis L. A turbine shroud assembly 22 extends circumferentially about the rotating blades 20. The shroud assembly 22 is disposed in close radial proximity to the tips 28 of the blades 20 and defines therewith a blade tip clearance 24 (FIG. 2b). The shroud assembly 22 includes a plurality of arcuate shroud segments 26 spaced circumferentially to provide an outer flow boundary surface of the gas path 11 around the blade tips 28.

In the embodiment shown in FIGS. 2a and 2b, each shroud segment 26 has a body extending axially from a leading edge 30 to a trailing edge 32 and circumferentially between opposed axially extending sides or lateral edges 34. In the present disclosure, the terms "front" and "frontward" refer to a direction approaching the leading edge 30, while the terms "rear" and "rearward" refer to a direction approaching the trailing edge 32. The body has a radially inner surface 36 providing the outer flow boundary surface of the gas path 11 around the blade tip 28 and a radially outer surface 38 relative to the engine axis L. Front and rear support legs 40, 42 (e.g. hooks) extend from the radially outer surface 38 to hold the shroud segment 26 into a surrounding fixed structure 44 of the engine 10, illustratively a casing for the shroud segment 26. As shown in FIG. 2b, the casing 44 includes impingement holes 46 for directing a flow of coolant C towards the radially outer surface 38 of the shroud, as will be discussed in further detail below. An optional top plate 48 may be affixed or otherwise installed above the casing 44, the top plate 48 including one or more additional impingement holes 50 for providing cooling to the casing 44.

According to some embodiments, each shroud segment 26 has a cooling scheme directing a flow of coolant C across the radially outer surface 38 and through the body of the shroud segment 26 from a front or upstream end portion of the body of the shroud segment 26 to a rear or downstream end portion thereof, as will be discussed in further detail below. This may allow to take full benefit of the pressure delta between the leading edge 30 (front end) and the trailing edge (the rear end). A cooling plenum 52 is defined between the front and rear support legs 40, 42 and the casing 44 supporting the shroud segments 26. The cooling plenum 52 is connected in fluid flow communication to a source of the flow of coolant C. The coolant can be provided from any suitable source but is typically provided in the form of bleed air from one of the compressor stages. If the top plate 48 is present, an additional cooling plenum 54 may be defined between the top plate 48 and the casing 44, directing the flow of coolant C towards the impingement hole(s) 46 and providing a certain degree of cooling to the casing 44 if desired.

The flow of coolant C exiting the impingement hole(s) 46 is directed or impinged onto a textured surface 56 on the radially outer surface 38. As will be discussed in further detail below, the textured surface 56 may promote heat transfer between the flow of coolant C and the shroud segment 26, for instance by increasing the wetted surface area of the radially outer surface 38 and/or by increasing the turbulence in the flow of coolant C. Various angles for the impingement hole(s) may be considered, for instance base on the desired level of cooling for the shroud segment 26. In the embodiment shown in FIG. 2B, the impingement holes 46 direct the flow of coolant C in a radially inward direction towards the textured surface 56, while in the embodiment shown in FIG. 3, the impingement holes 46 are angled towards the trailing edge 32 of the body of the shroud segment 26, thereby providing a rearward axial component. Other angles for the impingement hole(s) 46 may be contemplated as well. In various cases, the impingement holes 46 may be staggered axially along the casing 44 with respect to the engine axis L, distributing the impingement holes 46 along the casing 44 and thus improving the heat transfer between the flow of coolant C and the textured surface 56. Other positioning arrangements for the impingement holes 46 may be contemplated as well. As will be discussed in further detail below, the textured surface 56 may include peaks and valleys and/or turbulators to promote heat transfer between the shroud segment 26 and the flow of coolant C by increasing the wetted surface area and/or increasing the generated turbulence of the flow of coolant.

The cooling scheme further includes a plurality of cooling inlets 58 for directing the flow of coolant C from the cooling plenum 52 into a front or upstream end of the body of the shroud segment 26 after the coolant C has interacted with the textured surface 56, as will be discussed in further detail below. According to the illustrated embodiment, although not necessarily the case in all embodiments, the cooling inlets 58 are provided as a transverse row of inlet passages along the front support leg 40. The cooling inlets 58 then direct the flow of coolant C through a cooling flow passageway, illustratively a plurality of axial passageways 60, passing through the body of the shroud segment 26. Illustratively, the cooling inlets 58 include inlet ends opening on the cooling plenum 52 just downstream (rearwardly) of the front support leg 40 and an outlet end opening to the cooling flow passageway underneath the front support leg 40, as will be discussed in further detail below. As can be appreciated from FIG. 2B, each cooling inlet 58 may be angled to receive the flow of coolant C from the cooling plenum 52. The angle of inclination of the cooling inlets 58 may be an acute angle as measured from the radially outer surface 38 of the shroud segment 26 and oriented to direct the coolant toward the leading edge 30 of the shroud. According to the illustrated embodiment, the inlets 58 are angled at about 45 degrees from the radially outer surface 38 of the shroud segment 26, although other angles may be contemplated as well. In various cases, the acute angling of inlets 58 may direct the flow of coolant C towards the leading edge 30 within the body of the shroud segment 26, which may additionally promote heat transfer between the flow of coolant C and the shroud segment 26. As the combined cross-sectional area of the inlets 58 is small relative to that of the plenum 52, the coolant may be conveniently accelerated as it is fed into the cooling flow passageway. The momentum gained by the coolant as it flows through the inlet passages may contribute to proving enhanced cooling at the front end portion of the shroud segment 26.

As shown in FIG. 3, the axial passageways 60 are illustratively parallel cylindrical passageways that may be drilled or otherwise suitably formed in the body of the shroud segment 26. Other shapes for the axial passageways 60 may be contemplated as well. As discussed above, the axial passageways begin at the cooling inlets 58 and follow a length of the body of the shroud segment 26 towards the trailing edge 32. In various embodiments, the axial passageways 60 may promote heat transfer between the shroud segment 26, in particular from the radially inner surface 36, and the flow of coolant C. The number and dimensions of the axial passageways 60 may vary according to the cooling requirements of the shroud segment 26 and the overall dimensions of the shroud segment 26. For instance, a greater number of axial passageways 60 may be required to accommodate a greater flow of coolant C, while the diameter of the illustratively cylindrical axial passageways 60 may be limited by the overall thickness of the body of the shroud segment 26.

The cooling scheme further comprises a plurality of cooling outlets 62 for discharging coolant from the axial passageways 60. As shown in FIG. 2A, the plurality of outlets 62 may include a row of outlet passages distributed along the trailing edge 32 of the shroud segment 26. The cooling outlets 62 are sized to meter the flow of coolant discharged through the trailing edge 32 of the shroud segment 26. In the shown embodiment, the number of cooling inlets 58 and the number of cooling outlets 62 each correspond with the number of axial passageways 60. In some cases, the axial passageways 60 may outnumber the cooling inlets 58 and cooling outlets 62 (or vice-versa), for instance if the axial passageways 60 were to converge or diverge towards the inlets 58 or outlets 62.

Figure 4:
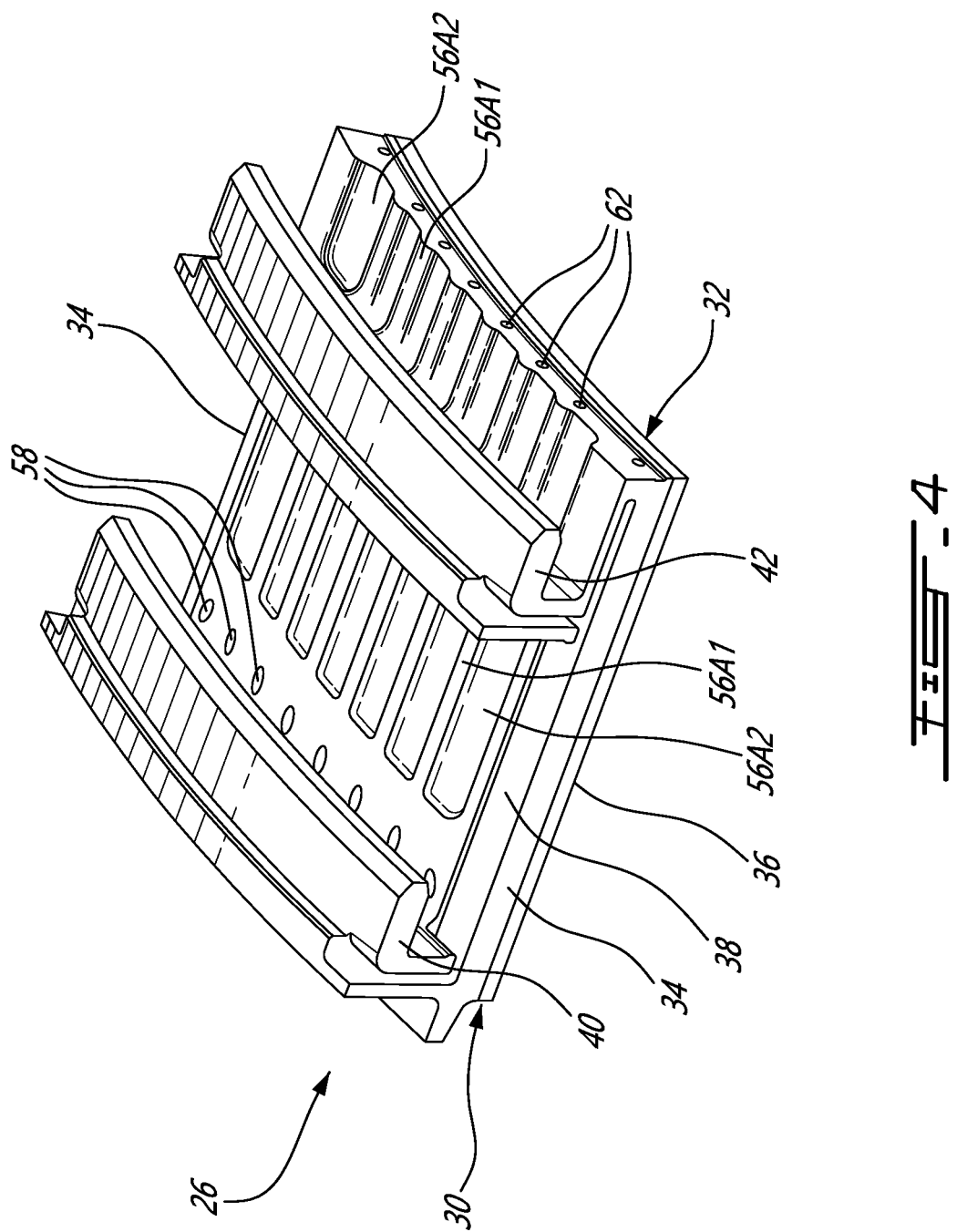
FIG. 4 is a perspective view of a turbine shroud segment according to an embodiment of the present disclosure.

Referring to FIG. 4, the textured surface 56 on the radially outer surface 38 of the shroud segment 26 may include a series of alternating parallel peaks 56A1 and valleys 56A2, thus increasing the wetted surface area of the radially outer surface 38 with reference to a comparable shroud segment having a substantially smooth radially outer surface 38. As the flow of coolant C is impinged onto the radially outer surface 38, the peaks 56A1 and valleys 56A2 provide an increased wetted surface area for the flow of coolant C, thus promoting heat transfer between the radially outer surface 38 and the flow of coolant C. The peaks 56A1 and valleys 56A2 may further aid in moderating the operating conditions while cooling the shroud segment 26. The valleys 56A2 correspond to recessed portions of the radially outer surface 38, while the peaks 56A1 correspond to raised portions separating the valleys 56A2. As such, the formation of the valleys 56A2, for instance by removing material from the radially outer surface 38, may contribute to an overall weight reduction for the shroud segment 26. As shown in FIG. 4, the positioning of the valleys 56A2 may correspond to the locations of the axial passageways 60 through the body of the shroud segment 26. As such, the peaks 56A1 and valleys 56A2 may be parallel to the axial passageways 60 and thus may follow a direction from the leading edge 30 to the trailing edge 32, illustratively beginning rearward of the cooling inlets 58 and terminating in front of the rear support leg 42, with optional additional peaks 56A1 and valleys 56A2 beginning rearward of the rear support leg 42 and terminating at the trailing edge 32. The number and width of the peaks 56A1 may depend on the number and sizing of the corresponding axial passageways 60, although in other cases additional peaks 56A1 may be formed between the peaks 56A1 corresponding to the axial passageways 60. Similarly, the number and width of the valleys 56A2 may depend on the number and spacing between adjacent peaks 56A1. The depth of the valleys 56A2 may vary as a function of the desired surface area increase of the radially outer surface 38 while ensuring the body of the shroud segment 26 maintains a minimum thickness to ensure its structural integrity.

As the flow of coolant C is impinged onto the radially outer surface 38 in a direction towards the cooling inlets 58, the increase in surface area provided by the peaks 56A1 and valleys 56A2 increases the rate of heat transfer between the radially outer surface 38 and the flow of coolant C, thus improving the overall cooling effect on the shroud segment 26. Referring additionally to FIG. 3, to further improve cooling performance, a ratio between the distance 64 between the outlets of the impingement hole(s) 46 and the radially outer surface 38 and the diameter of the impingement hole(s) 46 may be optimized. For instance, such a distance-to-diameter ratio may vary between 3 and 8 for optimal impingement performance, although other ratios may be contemplated as well. In addition, in various embodiments, the impingement hole(s) 46 may be positioned in the casing 44 and angled so that the flow of coolant C is impinged towards locations on the radially outer surface 38 that are known to be "hot spots", i.e. locations that may require a more direct flow of coolant C to attain a desired level of cooling.

In various embodiments, the textured surface 56 may further include a plurality of turbulators to further promote heat transfer between the radially outer surface 38 and the flow of coolant C, i.e. to improve cooling of the shroud segment 26. Such turbulators may include raised portions on the outer shroud surface 38 to increase turbulence in the flow of coolant C and/or increase the wetted surface area of the outer shroud surface 38. Referring to FIG. 5, such turbulators may illustratively include a plurality of crosses 56B. As shown, the crosses 56B are raised portions of the radially outer surface 38 that are positioned in line with one another in respective valleys 56A2. In the shown embodiment, each cross 56B occupies slightly less than the width of each valley 56A2 such that the crosses 56B are lined up single-file in a respective valley 56A2, although in other cases the crosses 56B may be sized differently such that they may sit side-by-side as well in a given valley 56A2. As shown, each cross 56B includes two arms at an angle of approximately ninety degrees with one another, although other angles may be considered as well. In the shown embodiment, the crosses 56B are each oriented to form the letter "X" when viewed from above with the leading edge 30 and trailing edge 32 appearing from left to right, although in other cases the crosses 56B may be oriented differently and/or may differ from one another in their orientations. As the flow of coolant C is impinged onto the radially outer surface 38, the peaks 56A1 and valleys 56A2 provide an increased wetted surface area for the flow of coolant C while the crosses 56B create turbulence in the flow of coolant C, thus promoting heat transfer between the radially outer surface 38 and the flow of coolant C. The crosses 56B may additionally increase the wetted surface area of the radially outer surface 38, further promoting heat transfer between the radially outer surface 38 and the flow of coolant C. In various cases, the number, height, width, and orientation of the various crosses 56B may be varied to create more or less turbulence in the flow of coolant C as desired. In addition, the respective dimensions of the various crosses 56B may vary between crosses 56B. While the sections of the peaks 56A1 and valleys 56A2 rearward of the rear support leg 42 are shown to not include any turbulators, in other cases, for instance if additional sources of cooling flow were provided to different sections of the shroud segment 26, crosses 56B may be added to these rearward peaks 56A1 and valleys 56A2 to enhance cooling at the rear end of the shroud segment 26.

Referring to FIG. 6, the turbulators may further or alternatively include a plurality of stand-offs 56C or pins. The term "stand-offs" used herein refers to a plurality of protrusions emanating from a surface, in this case the radially outer surface 38, to create turbulence in the flow of coolant C. The stand-offs 56C may additionally increase the wetted surface area of the radially outer surface 38, further promoting heat transfer between the radially outer surface 38 and the flow of coolant C. Illustratively, the stand-offs 56C are disposed within valleys 56A2 in a staggered formation, alternating between two and three stand-offs 56C per row. However, other arrangements may be contemplated as well. For instance, a greater number of stand-offs 56C may be arranged side-by-side if the corresponding valleys 56A2 were wider than the shown valleys 56A2. Additionally or alternatively, the sizing of the stand-offs 56C and the spacing between adjacent stand-offs 56C may be altered to increase or decrease the overall number of stand-offs. The number of stand-offs 56C may vary due to, for instance, the desired gains in generated turbulence and/or wetted surface area and various manufacturing constraints. Illustratively, the stand-offs are cylindrically-shaped, although other shapes may be considered as well. The height of the stand-offs 56C may vary as well, for instance based on the depth of the valleys 56A2 and/or the desired level of generated turbulence. In some cases, the sizing of the stand-offs 56C may vary from one standoff to another. As the flow of coolant C is impinged onto the radially outer surface 38, the peaks 56A1 and valleys 56A2 provide an increased wetted surface area for the flow of coolant C while the stand-offs 56C create turbulence in the flow of coolant C, thus promoting heat transfer between the radially outer surface 38 and the flow of coolant C. In some cases, various combinations of crosses 56B and stand-offs 56C may be implemented to attain a desired level of turbulence generation and hence a desired level of cooling of the shroud segment 26. Other types and/or shapes of turbulators may be considered as well. While the sections of the peaks 56A1 and valleys 56A2 rearward of the rear support leg 42 are not shown to include stand-offs 56C, in other cases, for instance if additional sources of cooling flow were provided to different sections of the shroud segment 26, stand-offs 56C may be added to these rearward peaks 56A1 and valleys 56A2 to enhance cooling at the rear end of the shroud segment 26.

In various embodiments, the textured surface 56 on the radially outer surface 38 may include a plurality of turbulators without peaks and valleys. For instance, depending on the given cooling requirements of a specific application, the generation of turbulence, for instance via crosses and/or stand-offs, in the flow of coolant C may provide sufficient cooling to the shroud segment 26 without the need for the increased surface area provided by the peaks and valleys. Referring to FIG. 7, there is shown a plurality of turbulators, illustratively a plurality of stand-offs 56C, protruding from an optional recessed portion 66 of the radially outer surface 38 to generate turbulence in the flow of coolant C to promote heat transfer between the radially outer surface 38 and the flow of coolant C. In various cases, the optional recessed portion 66 may reduce the overall weight of the shroud segment 26 due to the removed material from the radially outer surface 38, and its depth may vary, for instance, based on the desired weight of the shroud segment 26, the desired height of the turbulators disposed within, and the sizing of the axial passageways 60 disposed within the body of the shroud segment 26. In other cases, the turbulators may be disposed directly on the radially outer surface 38 in the absence of the recessed portion 66. In other cases, the turbulators may include crosses 56B or a combination of crosses 56B and stand-offs 56C. Other protruding turbulator shapes may be considered as well.

As should be appreciated, many different construction and molding techniques for forming the shroud segment 26 are contemplated. For instance, the shroud segment 26 may be made from a metal injection molding process. In such an exemplary process, a compound including various metal powders and binders can be formed into complicated shapes such as the textured surface 56 and then baked in an oven to form a cast, thus simplifying the process compared to traditional casting techniques and reducing cost and weight. Such a metal injection molding process may similarly reduce the time and cost of machining complex surface features such as the textured surface 56 compared to machining such features through traditional machining means. Additionally or alternatively, the cooling inlets 58, axial passageways 60 and cooling outlets 62 may be drilled into the body of the shroud segment 26. Other manufacturing processes (e.g. additive manufacturing, 3D printing) may be contemplated as well.

Various embodiments of the above-described cooling schemes thus provide for a flow of coolant C being impinged by one or more impingement holes 46 in a structure 44 of the engine 10 onto a textured surface 56 on the radially outer surface 38 of the shroud segment 26. Such textured surface 56 may include peaks 56A1 and valleys 56A2 and/or turbulators such as crosses 56B or stand-offs 56C to promote heat transfer by increasing the wetted surface area of the radially outer surface 38 and/or generating turbulence in the flow of coolant C. The flow of coolant C is then directed through cooling inlets 58 through axial passageways 60 within the body of the shroud segment 26 to provide additional cooling to the shroud segment 26 before exiting via a transverse row of outlets 62 provided at the trailing edge 32 of the shroud segment 26.

In this way, in various embodiments the flow of coolant C may effectively and uniformly cool the entire shroud segment 26 via heat transfer at the radially outer surface 36 and within the body of the shroud segment 26. In various embodiments, the above-described shroud segments 26 may increase the overall efficiency of the gas turbine engine 10 by, for instance, reducing weight and providing additional cooling. In addition, the lifespan of the shroud segment 26 may be increased due to the increased cooling capacity. Further, in various embodiments, the improved cooling efficiency provided by the various cooling schemes may reduce the quantity of coolant flow required to achieve the desired level of cooling of the shroud segment 26. In addition, in various embodiments the gas turbine engine 10 may be able to operate with a higher gas path temperature due to the improved cooling efficiency capabilities.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A turbine shroud segment for a gas turbine engine having an annular gas path extending about an engine axis, the gas turbine engine having a turbine rotor mounted for rotation about the engine axis and having a plurality of blades extending into the annular gas path, the turbine shroud segment comprising:
 a body extending axially between a leading edge and a trailing edge and circumferentially between a first lateral edge and a second lateral edge, the body having a radially outer surface and a radially inner surface, the radially outer surface including a textured surface exposed to a cooling flow, the radially inner surface defining an outer flow boundary surface of the annular gas path next to a tip of one of the plurality of blades; and
 a cooling flow passageway defined in the body and extending axially between one or more cooling inlets receiving the cooling flow from the textured surface and one or more cooling outlets, wherein the one or more cooling outlets are distributed in a row along the trailing edge of the body and wherein the one or more cooling inlets are defined in the radially outer surface adjacent to the leading edge.

2. The turbine shroud segment as defined in claim 1, wherein the textured surface includes a plurality of recessed portions of the radially outer surface interspersed by parallel raised portions of the radially outer surface, the alternating raised portions and recessed portions defining peaks and valleys in the radially outer surface.

3. The turbine shroud segment as defined in claim 2, wherein the cooling flow passageway includes a plurality of parallel axial passageways defined in the body positioned in line with the plurality of raised portions on the radially outer surface.

4. The turbine shroud segment as defined in claim 2, further comprising a plurality of turbulators protruding from the recessed portions in the radially outer surface, the turbulators generating turbulence in the cooling flow.

5. The turbine shroud segment as defined in claim 4, wherein the plurality of turbulators include crosses and/or stand-offs.

6. The turbine shroud segment as defined in claim 1, wherein the textured surface includes a plurality of protruding turbulators generating turbulence in the cooling flow.

7. The turbine shroud segment as defined in claim 6, wherein the plurality of turbulators includes crosses and/or stand-offs.

8. A turbine shroud assembly for a gas turbine engine having an annular gas path extending about an engine axis, the turbine shroud assembly comprising:
  a shroud segment including a body extending axially between a leading edge and a trailing edge and circumferentially between a first lateral edge and a second lateral edge, the body having a radially outer surface and a radially inner surface, the radially outer surface including a textured surface exposed to a cooling flow, one or more support legs extending radially outward from the radially outer surface, a cooling flow passageway defined in the body and extending axially from one or more cooling inlets at a front end adjacent the leading edge to one or more cooling outlets at a rear end adjacent the trailing edge; and
  a casing disposed radially outward from the shroud segment and engaged by the one or more support legs, the casing including one or more impingement holes directing the cooling flow into a cooling plenum defined between the casing and the radially outer surface and impinging the cooling flow onto the textured surface.

9. The turbine shroud assembly as defined in claim 8, further comprising a top plate disposed onto the casing, the top plate including one or more additional impingement holes directing the cooling flow into an additional cooling plenum defined between the top plate and the casing.

10. The turbine shroud assembly as defined in claim 8, wherein the one or more impingement holes in the casing are angled in a direction towards the trailing edge of the body of the shroud segment.

11. The turbine shroud assembly as defined in claim 8, wherein the one or more cooling inlets are angled rearwardly to receive the cooling flow from the cooling plenum.

12. The turbine shroud assembly as defined in claim 8, wherein the textured surface includes a plurality of recessed portions of the radially outer surface interspersed by parallel raised portions of the radially outer surface, the alternating raised portions and recessed portions defining peaks and valleys in the radially outer surface.

13. The turbine shroud assembly as defined in claim 12, wherein the cooling flow passageway includes a plurality of parallel axial passageways defined in the body positioned in line with the plurality of raised portions on the radially outer surface.

14. The turbine shroud assembly as defined in claim 12, further comprising a plurality of turbulators protruding from the recessed portions in the radially outer surface, the turbulators generating turbulence in the cooling flow.

15. The turbine shroud assembly as defined in claim 14, wherein the plurality of turbulators include crosses and/or stand-offs.

16. The turbine shroud assembly as defined in claim 12, wherein the plurality of raised portions and recessed portions on the radially outer surface begin rearward of the one or more cooling inlets and terminate at one of the one or more support legs proximate the trailing edge.

17. The turbine shroud assembly as defined in claim 8, wherein the textured surface includes a plurality of protruding turbulators generating turbulence in the cooling flow.

18. The turbine shroud assembly as defined in claim 17, wherein the plurality of turbulators includes crosses and/or stand-offs.

19. The turbine shroud assembly as defined in claim 8, wherein the one or more cooling outlets are distributed in a row along the trailing edge of the body.

* * * * *